(12) United States Patent
Heubner

(10) Patent No.: US 10,774,882 B2
(45) Date of Patent: Sep. 15, 2020

(54) ACTUATOR, IN PARTICULAR SLAVE CYLINDER, FOR A DEVICE FOR A CLUTCH ACTUATION IN A MOTOR VEHICLE

(71) Applicant: FTE automotive GmbH, Ebern (DE)

(72) Inventor: Wilhelm Heubner, Itzgrund (DE)

(73) Assignee: FTE automotive GmbH, Ebren (DE)

( * ) Notice: Subject to any disclaimer, the term of this patent is extended or adjusted under 35 U.S.C. 154(b) by 61 days.

(21) Appl. No.: 16/072,961

(22) PCT Filed: Dec. 30, 2016

(86) PCT No.: PCT/EP2016/002190
§ 371 (c)(1),
(2) Date: Jul. 26, 2018

(87) PCT Pub. No.: WO2017/129217
PCT Pub. Date: Aug. 3, 2017

(65) Prior Publication Data
US 2019/0032725 A1    Jan. 31, 2019

(30) Foreign Application Priority Data
Jan. 26, 2016 (DE) .................. 10 2016 000 708

(51) Int. Cl.
F16D 25/08    (2006.01)
(52) U.S. Cl.
CPC ......... *F16D 25/083* (2013.01); *F16D 25/088* (2013.01); *F16D 2025/081* (2013.01)
(58) Field of Classification Search
CPC . F16D 25/083; F16D 25/088; F16D 2025/081
See application file for complete search history.

(56) References Cited

U.S. PATENT DOCUMENTS 6,167,995 B1 * 1/2001 Lindner ............... F16D 25/083
192/3.57
9,388,831 B2 7/2016 Brosch et al.
(Continued)

FOREIGN PATENT DOCUMENTS

CN    201137653 Y    10/2008
DE    19633420 A1    3/1997
(Continued)

OTHER PUBLICATIONS

International Preliminary Report, Applicant: FTE automotive GmbH, Application No. PCT/EP2016/002190, dated Aug. 9, 2018, 6 pages.
(Continued)

*Primary Examiner* — David J Hlavka
(74) *Attorney, Agent, or Firm* — Reising Ethington P.C.

(57) ABSTRACT

An actuator (12) for a device for clutch actuation in a motor vehicle has cylinder housing (14) with a pneumatic pressure connection (Ep) and at least one hydraulic pressure connection ($E_{H1}$, $E_{H2}$), in which cylinder housing a piston (16) is operatively connected to a longitudinally moveably control element (G). The piston together with the cylinder housing defines a pneumatic chamber ($K_p$) that can be pressurized via the pneumatic pressure connection. At least one hydraulic chamber ($K_{H1}$, $K_{H2}$) is connected to the hydraulic pressure connection. The chambers are separated from one another by a sealing arrangement (18, 20). In a very compact design of the actuator, a pneumatic operative surface ($A_{H2}$) axially delimiting the hydraulic chamber are formed on the piston, so that by pressurizing the pneumatic chamber the control element can be longitudinally moved via the piston in an actuating direction (B) against an external return force acting in a return direction (R), and a piston movement can be controlled by a pressure build-up in the at least one hydraulic chamber.

20 Claims, 9 Drawing Sheets

(56) References Cited

U.S. PATENT DOCUMENTS

| | | | |
|---|---|---|---|
| 2001/0030098 A1* | 10/2001 | Drexl | F16D 25/083 |
| | | | 192/85.51 |
| 2004/0206598 A1* | 10/2004 | Braun | F16D 25/083 |
| | | | 192/85.01 |
| 2017/0268583 A1* | 9/2017 | Dole | F16D 25/08 |
| 2019/0186564 A1* | 6/2019 | Ruchardt | F16D 25/083 |

FOREIGN PATENT DOCUMENTS

| | | |
|---|---|---|
| DE | 102011078820 A1 | 1/2013 |
| DE | 102014102880 A1 | 9/2015 |
| EP | 1630439 A1 | 3/2006 |

OTHER PUBLICATIONS

German Office Action; Applicant: FTE automotive GmbH; Application No. 102016000708.7; dated Sep. 9, 2016; 8 Pages.

\* cited by examiner

ACTUATOR, IN PARTICULAR SLAVE CYLINDER, FOR A DEVICE FOR A CLUTCH ACTUATION IN A MOTOR VEHICLE

TECHNICAL FIELD

The invention relates generally to a pneumatically actuable and hydraulically controllable actuator. In particular, the invention relates to a slave cylinder for a clutch actuation device in a motor vehicle, as used on a large scale in the automobile industry.

PRIOR ART

Automated or automatic clutch installations with wet or dry friction clutches which, for transmission of torque, are kept in an engaged state or closed by spring force and can be transferred by use of a pneumatic, hydraulic or electrical actuator against the spring force to a disengaged or open state in order to interrupt transmission of torque have been known for a long time. Pneumatic actuators or setting cylinders with an associated pneumatic switching valve arrangement are predominantly used for clutch actuation in utility vehicles (e.g trucks, buses) with automated clutch installations often referenced to as 'CBW'=or 'Clutch By Wire' for easing driver workload, with automated manual transmissions for automation even of manual change actions or with double clutch transmissions, since compressed air is already available in utility vehicles, insofar as both the operating medium and the drive energy for a pneumatic actuator are present and do not otherwise have to be supplied.

In the case of actuation of the clutch it is important to be able to execute sensitive setting movements by use of the actuator, particularly in the region of the clutch pressure point, so as to bring about or interrupt transmission of torque as smoothly as possible. Conventional motor vehicle clutches have a force/travel plot in which force over travel rises continuously, for example substantially linearly, up to a maximum value in the region of the clutch pressure point and thereafter no longer rises or slightly declines. It will be evident therefrom that the pressure built up in a pneumatic actuator for reaching the force maximum is too high, after exceeding this maximum, in order to maintain a position in the vicinity of the clutch pressure point. In order to nevertheless make possible a relatively sensitive positional setting in the vicinity of the clutch pressure point use is made in the prior art of relatively complicated algorithms for control of the actuator pressure, in which pneumatic switching valves connected with the actuator are cyclically activated, i.e. by pulse width modulation and/or pulse frequency modulation. In addition, in order to optimize the sensitivity of the setting, pneumatic switching valves with different throughflow cross-sections for pressure control in the actuator are connected in parallel with one another. Systems of that kind are available from, for example, the company Knorr-Bremse Systeme für Nutzfahrzeuge GmbH ('Knorr'), Munich, Germany.

Pneumatic switching valves are activated very frequently in the course of cyclic operation. In practice, for example, the pneumatic switching valves are designed for several hundred million actuations, which obviously requires a correspondingly robust and expensive construction of the switching valves. Furthermore, cyclic operation of the pneumatic switching valves, i.e. constant alternation of application of air and venting of air, is accompanied by a comparatively high consumption of compressed air, which is unfavorable with respect to energy efficiency. Not least, integration of the pneumatic switching valves, i.e. the inlet and outlet magnetic valves, in the actuator as is the case with, for example, the systems of the company Knorr has the consequence that the actuator requires a relatively large amount of constructional space not only in radial direction, but also in axial direction. However, the available installation space is usually rather tightly dimensioned at or in the transmission housing.

Moreover, for improvement of sensitivity (accuracy and setting speed) in positional setting with a pneumatic setting cylinder it has already been proposed in the prior art—see, for example, documents DE 10 2011 078 820 A1 and DE 10 2010 022 747 A1—to mechanically connect a hydraulic cylinder in series with the pneumatic setting cylinder. In that case, the hydraulic cylinder on each occasion serves the purpose of braking or damping the movement of the piston of the pneumatic setting cylinder.

More precisely, according to the document DE 10 2011 078 820 A1 (FIG. 1) a setting drive pneumatically driven with travel sensing by use of a position sensor includes a pneumatic piston, which can be loaded with pneumatic pressure on both sides, with a piston rod. A double-acting hydraulic cylinder having a hydraulic piston, which separates two hydraulic chambers in the hydraulic cylinder, with a piston rod on one side is seated on a common axle behind the pneumatic setting drive. The piston rod of the pneumatic piston and the piston rod of the hydraulic piston are coupled together for hydraulic damping of the setting movements produced by the pneumatic setting drive. In that case, the pneumatic piston can be braked in defined manner or fixed by appropriate activation, which is dependent on the travel signal of the position sensor, of a proportional valve present in a hydraulic line connecting the two hydraulic chambers of the hydraulic cylinder.

Moreover, in the prior art a second displaceable piston is arranged in the hydraulic cylinder and separates in the hydraulic cylinder a further chamber from the hydraulic chamber, which is disposed on the side of the hydraulic piston remote from the pneumatic setting drive. Gas under elevated pressure is enclosed in this further chamber. The gas serves the purpose, in the case of movement of the hydraulic piston, of providing compensation for different volume changes in the two hydraulic chambers, which result from the two hydraulic effective areas of the hydraulic piston differing from side to side (entire piston cross-section on one side, piston cross-section minus piston rod cross-section on the other side), and for thermal expansion of the hydraulic fluid. The second piston and the further chamber in the hydraulic cylinder thus form a compensation unit with an effect corresponding with that of a single-tube damper.

By contrast, in the prior art according to document DE 10 2010 022 747 A1 (FIG. 1) a pneumatically driven setting cylinder has a pneumatic piston which can be loaded on one side with compressed air by way of a compressed air chamber and is loaded on the other side by way of an opposing force of a vehicle clutch. The pneumatic piston is coupled by a piston rod with a hydraulic piston of a double-acting hydraulic cylinder which is flange-mounted on or screw-connected with a housing of the pneumatic setting cylinder and has two pressure chambers. The two pressure chambers of the hydraulic cylinder are connected together by way of a line with a throttle and a switching valve (2/2-way valve) connected in series therewith. When the switching valve is closed, the hydraulic cylinder blocks movement of the pneumatic piston. If, on the other hand, the switching valve is open then the pneumatic piston is able to move and, in particular, braked or damped as a function of the fixed throttle cross-section of the throttle.

However, the damping or braking behavior is not settable here. In addition, a compensation unit as in the above-described prior art is not provided, so that the hydraulic region of this arrangement would have to have substantial levels of 'softness' (such as air inclusions or the like) in order to even permit movement. Finally, the above comments with respect to the requirement for axial constructional space particularly apply, in corresponding manner, to this prior art.

It is desirable to have an actuator of simplest possible construction, particularly a slave cylinder for a device for clutch actuation in a motor vehicle, which avoids the discussed disadvantages and—compared with the above prior art—is of particularly compact construction.

ILLUSTRATION OF THE INVENTION

According to one aspect of the invention, an actuator, particularly a slave cylinder, for a device for clutch actuation in a motor vehicle has a cylinder housing which has a pneumatic pressure connection and at least one hydraulic pressure connection and in which a piston operatively connected with a setting element is received to be longitudinally displaceable. The setting element together with the cylinder housing defining defines a pneumatic chamber, which is able to be loaded with pressure by way of the pneumatic pressure connection, and at least one hydraulic chamber, which is connected with the hydraulic pressure connection. The chambers are separated from one another by a sealing arrangement, wherein a pneumatic effective area axially bounding the pneumatic space and at least one hydraulic effective area axially bounding the hydraulically chamber and oriented oppositely to the pneumatic effective area are formed at the piston so that through pressure loading of the pneumatic chamber the setting element is longitudinally displaceable by way of the piston in an actuating direction against an external restoring force acting in a restoring direction and a piston movement is controllable by pressure build-up, which is passive or active and acts at least oppositely to the direction of the pneumatic pressure loading, in the at least one hydraulic chamber.

As a result of provision of the pneumatic and hydraulic effective areas at one and the same piston in one and the same cylinder housing there is at the outset the advantage of a smaller axial constructional length of the actuator by comparison with the prior art outlined in the introduction. Moreover, by comparison with a solution in which two (or more) housings arranged in a row one after the other are flange-mounted on one another there is reliable avoidance in accordance with one aspect of the invention of static overdetermination which in the prior art can lead to jamming of or increased friction at the moved part or parts if the housings are not very precisely centered. In addition, through omission of seals between different housings in accordance with one aspect of the invention there is a smaller outlay on sealing.

If in an instance of use of the actuator not merely one, but two opposed hydraulic effective areas are needed in order to control setting movements in two different directions there is preference, particularly with respect to a small requirement for constructional space and low cost, for a configuration in which the cylinder housing has two hydraulic pressure connections and together with the piston defines, in addition to the pneumatic chamber, two hydraulic chambers which are each connected with a respective one of the hydraulic pressure connections and which are separated from one another and from the pneumatic chamber by means of two sealing arrangements, wherein apart from the pneumatic effective area two hydraulic effective areas each axially bounding a respective one of the hydraulic chambers are formed oppositely to one another at the piston so that movement of the piston in the restoring direction can be controlled in braking manner by build-up of pressure in a first one of the hydraulic chambers and in the actuating direction can be controlled in braking manner by build-up of pressure in a second one of the hydraulic chambers.

A particularly short constructional length of the actuator can be achieved if the cylinder housing and the piston, in order to form the at least one hydraulic chamber and the hydraulic effective area bounding this, are formed to be stepped at the circumference.

Moreover, for a space-saving as well as low-friction and low-wear arrangement very close to the transmission the actuator can be constructed in the form of a central release device, in which case the cylinder housing has a passage for a transmission shaft in the region of a center axis and the piston received in the cylinder housing to be longitudinally displaceable is an annular piston carrying a release bearing as setting element.

In that case, in principle, two hydraulic chambers can be formed in the cylinder housing one behind the other at the outer circumference or inner circumference of the annular piston and the pneumatic chamber can be formed at an end of the annular piston. However, with respect to a particularly short axial constructional length a configuration is preferred in which one of the hydraulic chambers is formed at the outer circumference of the annular piston and another one of the hydraulic chambers is formed at the inner circumference of the annular piston, with the pneumatic chamber being disposed at the end with respect to the annular piston.

If the actuator is to be disposed in operative connection with the clutch by direction change or translation way of, for example, a clutch lever, then available as an alternative the actuator can be constructed in the form of a clutch slave cylinder with a central blind bore, in which the piston is received to be longitudinally displaceable. The piston is connected, to be effective in terms of actuation, with a central piston rod as a setting element. By comparison with a central release device, such an actuator is more flexible with respect to the location of the mounting, is less strongly thermally loaded, is more easily exchangeable and also is not exposed to abraded material from the clutch.

In a more advantageous and simpler embodiment of such an actuator the two hydraulic chambers can be formed axially one behind the other at the outer circumference of the piston, whereas the pneumatic chamber is disposed at the end with respect to the piston.

In an alternative, which is shorter with respect to constructional length, of the actuator with a piston rod the piston can have a central recess into which a central projection provided at the cylinder housing enters, where one of the hydraulic chambers is formed between the projection of the cylinder housing and the recess of the piston and another one of the hydraulic chambers is disposed at the outer circumference of the piston, with the pneumatic chamber being disposed at the end with respect to the piston.

Finally, in an advantageous development of the aforedescribed different actuators at least the sealing arrangement separating the pneumatic chamber from the respective hydraulic chamber can comprise two sealing elements, which are axially spaced from one another and which have therebetween an intermediate space connected with the environment by way of an equalization channel. Whereas in this embodiment it is also possible for a degree of lubrication of the pneumatic seal to be achieved by way of the hydraulic seal, the equalization channel particularly serves the purpose of preventing air from passing from the pneumatic side into the hydraulic system.

BRIEF DESCRIPTION OF THE DRAWINGS

The invention is explained in more detail in the following by way of preferred embodiments with reference to the accompanying, partly schematic drawings, in which the same or corresponding parts have been provided with the same reference numerals—in a given case supplemented with elevated dashes (' or ") for identification of the respective valve or actuator variants—and in which, for simplification of the illustration, elastomeric or elastic parts are illustrated in the undeformed state. In the drawings.

Figure 1:
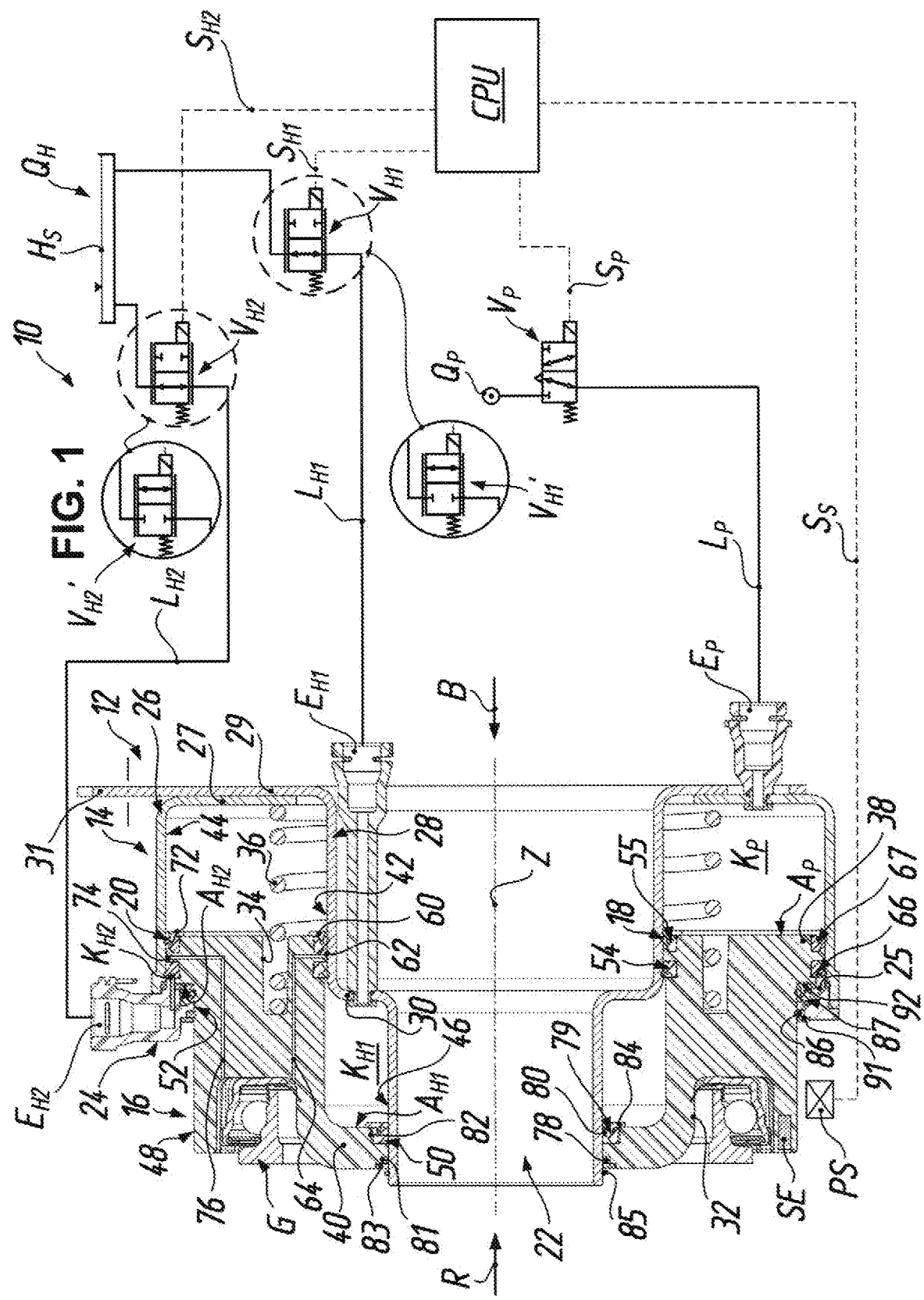
FIG. 1 shows a circuit diagram of a device for actuation of a clutch in a motor vehicle as a first embodiment according to the invention, with an actuator, which is illustrated in a longitudinal sectional view, in accordance with a first actuator variant, which is constructed in the manner of a central release device and disposed in a spring-biased basic setting, wherein pressure chambers of the actuator are connected by way of a 3/2-way switching valve with a compressed air source or by way of two 2/2-way proportional valves with a reservoir for hydraulic fluid.

In the drawings and in the following description an illustration or explanation of the respective clutch and the mode and manner in which the respective setting element at the actuator—release bearing in the case of the first actuator variant; piston rod in the case of the second and third actuator variants—is disposed in operative connection with the clutch has been dispensed with, since features with respect thereto are familiar in structural and functional respects to one of ordinary skill in the art and further explanations with regard to those are not necessary for an understanding of the present invention. Equally, in the case of all actuator variants the respective piston is secured against turning in the cylinder housing, but this has not been individually illustrated since these measures are known per se.

DETAILED DESCRIPTION OF THE EMBODIMENTS

In FIG. 1 the reference numeral 10 generally denotes a device for actuation of a clutch (not illustrated) in a motor vehicle. The actuation of the clutch in that case takes place with generation of a linear setting movement in an actuating direction in correspondence with the arrow B (thus to the left in FIG. 1) against a restoring force, which acts in an opposite restoring direction in correspondence with the arrow R (accordingly to the right in FIG. 1) and is usually generated by one or more clutch springs (not shown).

The device 10 comprises, for generation of the setting movement, in the first instance an actuator 12 comprising a cylinder housing 14 and a piston 16 received therein to be longitudinally displaceable, which together define various pressure chambers and different effective areas in the actuator 12. Thus, the actuator 12 has a pneumatic chamber $K_P$, which is bounded by a pneumatic effective area $A_P$ and which can be selectably loaded with a pneumatic pressure from a compressed air source $Q_P$ so as to generate at the pneumatic effective area $A_P$ a force in the actuating direction B. In addition, the actuator 12 has a first hydraulic chamber $K_{H1}$, which can be hydraulically connected with a reservoir $Q_H$ for hydraulic fluid by way of an electromagnetically actuable, first 2/2-way proportional valve $V_{H1}$ and which is bounded by a first hydraulic effective area $A_{H1}$ having the same orientation with respect to the pneumatic effective area $A_P$ (see also FIG. 2). Moreover, the actuator 12 has a second hydraulic chamber $K_{H2}$, which can be hydraulically connected with the reservoir $Q_H$ by way of an electromagnetically actuable, second 2/2-way proportional valve $V_{H2}$ and which is bounded by a second hydraulic effective area $A_{H2}$ opposite with respect to the pneumatic effective area $A_P$ and to the first hydraulic effective area $A_{H1}$ (cf. again FIG. 2). A setting element G, which is operatively connected with the piston 16, of the actuator 12 can be loaded with force in a manner not described in more detail and moved in defined manner by way of the aforesaid effective areas $A_P$, $A_{H1}$, $A_{H2}$, which respectively axially bound the respective chamber $K_P$, $K_{H1}$, $K_{H2}$ in the actuator 12 and which here are all formed at the piston 16. In the illustrated embodiment the setting element G is a release bearing, which is known per se and mounted on the piston 16 and which is in actuation-effective connection with the clutch in a way which is not shown here and is similarly known per se.

In addition, for the above circuit connection of the actuator 12 into the device 10 the cylinder housing 14 has a pneumatic pressure connection $E_P$, by way of which the pneumatic chamber $K_P$ can be loaded with pressure, and two hydraulic pressure connections $E_{H1}$, $E_{H2}$, which are each connected with a respective one of the hydraulic chambers $K_{H1}$, $K_{H2}$. The latter, as will be explained in detail, are separated from one another and from the pneumatic chamber $K_P$ by means of two sealing arrangements 18, 20.

Moreover, the device 10 comprises an electronic control CPU, by which the pressure loading of the pneumatic chamber $K_P$ and valve settings of the first and second 2/2-way proportional valves $V_{H1}$, $V_{H2}$ can be controlled independently of one another, as will be described in detail in the following. In that regard, movement of the setting element G in the restoring direction R can be braked in controlled manner by way of the first hydraulic effective area $A_{H1}$ by closing the first 2/2-way proportional valve $V_{H1}$, and movement of the setting element G in the actuating direction B can be braked in controlled manner by way of the second hydraulic effective area $A_{H2}$ by closing the second 2/2-way proportional valve $V_{H2}$.

For pressure loading of the pneumatic chamber $K_P$ of the actuator 12 the pneumatic pressure connection $E_P$ at the cylinder housing 14 is connected by way of a pneumatic line L with the compressed air source $Q_P$. In that case, provided between the compressed air source $Q_P$ and the pneumatic chamber $K_P$ of the actuator 12 is a spring-biased, electromagnetically actuable 3/2-way switching valve $V_P$ arranged in the pneumatic line $L_P$. The 3/2-way switching valve $V_P$ can be activated by the control CPU by way of an electrical control line $S_P$. In that case, the 3/2-way switching valve $V_P$ in the state of activation by the control CPU connects the compressed air source $Q_P$ with the pneumatic chamber $K_P$ of the actuator 12 and in the state of non-activation by the control CPU connects the pneumatic chamber $K_P$ of the actuator 12 with the environment (indicated in FIG. 1 by the triangle on top of the 3/2-way switching valve $V_P$).

As far as the hydraulic circuit connection of the actuator 12 into the device 10 is concerned, the pressure connections $E_{H1}$, $E_{H2}$ thereof are each connected with the reservoir $Q_H$ by way of a respective hydraulic line $L_{H1}$, $L_{H2}$. The aforementioned 2/2-way proportional valves $V_{H1}$, $V_{H2}$ are in that case each seated in a respective one of the hydraulic lines $L_{H1}$, $L_{H2}$ and are each connected by way of a respective electrical control line $S_{H1}$, $S_{H2}$ with the control CPU. In a first valve alternative—respectively encircled in FIG. 1 by a dashed line—the 2/2-way proportional valves $V_{H1}$, $V_{H2}$ are, in the state of non-activation by the control CPU, spring-biased into a through/zero setting so as to connect the respective hydraulic chamber $K_{H1}$, $K_{H2}$ of the actuator 12 with the reservoir $Q_H$ for the hydraulic fluid. Without current, the hydraulic chambers $K_{H1}$, $K_{H2}$ of the actuator 12 in this valve variant are thus without pressure.

In constructional terms, the 2/2-way proportional valves $V_{H1}$, $V_{H2}$ can, for example, be constructed as electromagnetically actuable 2/2 ball-seat valves spring-biased into a through/zero setting in the non-activated state, as known in principle from document UK Patent GB2305227B of the present applicant and is hereby incorporated by reference. In these valves arranged between a pressure chamber and a drain chamber of a valve housing is a ball seat for a spherical valve body which is received in the drain chamber. A valve spring arranged in the pressure chamber urges the valve body away from the ball seat, while provided on the side remote from the pressure chamber is a magnetic drive by which the valve body can be urged in the direction of the valve seat. As a function of current supply to the magnetic drive a predominantly annular throttle gap of predetermined size arises between the valve body and the valve seat and depending on size provides a greater or lesser degree of resistance to throughflow of the hydraulic fluid from the pressure chamber to the drain chamber, this resistance increasing the pressure in the pressure chamber (backpressure principle). Whereas in the present case of use of such a valve the pressure chamber is connected with the corresponding pressure connection $E_{H1}$ or $E_{H2}$ of the actuator 12, the drain chamber of the valve is connected with the reservoir $Q_H$ for hydraulic fluid. 12, the drain chamber of the valve is connected with the reservoir $Q_H$ for hydraulic fluid.

However, in a second valve alternative—in FIG. 1 encircled in each instance by a solid line near the circuit connection provided there—the design can also be such that the 2/2-way proportional valves $V_{H1}'$, $V_{H2}'$ in the state of non-activation by the control CPU are spring-biased into a blocking/zero setting so as to separate the respective hydraulic chamber $K_{H1}$, $K_{H2}$ of the actuator 12 from the reservoir $Q_H$. If the valve current supply in this valve alternative is lost or is switched off then the hydraulic actuation state of the actuator 12 is maintained or 'frozen'. In a design as a 2/2 ball-seat valve, then for the second valve alternative by comparison with the above-described construction merely the valve spring and the magnetic drive would be changed over, i.e. arranged on other sides with respect to the valve body, in which case the valve spring would be so designed in terms of force that it would be capable of resisting the maximum hydraulic pressure, which arises in the system, at the valve body.

Finally, with respect to the schematic circuit diagram of the device 10 according to FIG. 1 it should be noted that provided at or in the actuator 12 is a sensor arrangement with a position sensor PS, which is in fixed position with respect to the cylinder housing 14 and can be, for example, a Hall sensor, and a signal element SE mounted on the piston 16, for example in the form of a magnet, which is, for example, received in a piston recess provided at the end face, as shown in FIG. 1. In that regard, the position sensor PS is connected with the control CPU by way of a signal line $S_S$. The stroke or travel of the piston 16 in the cylinder housing 14 of the actuator 12 can be detected with the help of this sensor arrangement in a manner known per se.

Further details of the actuator 12, which in the embodiments according to FIGS. 1 and 6 to 9 is constructed in the form of a central release device, can be inferred from, in particular, FIGS. 2 to 5. According to those, the cylinder housing 14 has in the region of a center axis Z a central passage 22 for a transmission shaft (not shown), in which case the piston received in the cylinder housing 14 to be longitudinally displaceable is an annular piston 16, which carries as setting element G—as already mentioned—a release bearing known per se for action on the clutch (not illustrated). As will be described in more detail in the following, in that case the cylinder housing 14 and the annular piston 16 of the actuator 12 are shaped to be stepped at the circumference for formation of the two hydraulic chambers $K_{H1}$, $K_{H2}$ and the hydraulic effective areas $A_{H1}$, $A_{H2}$ bounding these.

In the illustrated embodiment the cylinder housing 14 is made from substantially three parts arranged concentrically with respect to the center axis Z, namely an annular first housing section 24, which is preferably injection-molded from plastic material and which has a fixing shoulder 25, a sleeve-like second housing section 26, which is preferably formed from metal by reshaping and which has at the axial end a radially inwardly extending annular surface 27, and a sleeve-like stepped third housing section 28, which is preferably similarly formed from metal by reshaping and which has at the axial end a radially outwardly extending annular flange 29. Whereas the first housing section 24 is inserted by the fixing shoulder 25 thereof into the second housing section 26 and secured and sealed in this position in suitable manner (shown merely schematically in the figures), the second housing section 26 and the third housing section 28 are secured to one another in the region of the annular flanges 27, 29, for example by a weld connection. According to, in particular, FIG. 3 the second hydraulic pressure connection $E_{H2}$ is integrally formed at the first housing section 24. The pneumatic pressure connection $E_P$, which is formed by a plastic material part, is sealingly secured in suitable manner to the annular flange 27 of the second housing section 26. Finally, the first hydraulic pressure connection $E_{H1}$, which is similarly formed by a plastic material part, is mounted in analogous manner on a step 30 of the third housing section 28. The annular flange 29 of the third housing section 28 can, moreover, also serve for securing the actuator 12 in or at a transmission housing (not shown), as indicated in FIGS. 1 and 2 at the top at 31 by a radial extension with a dot-dashed center axis of a fastener, which is otherwise not shown.

Figures 2, 3, 4:
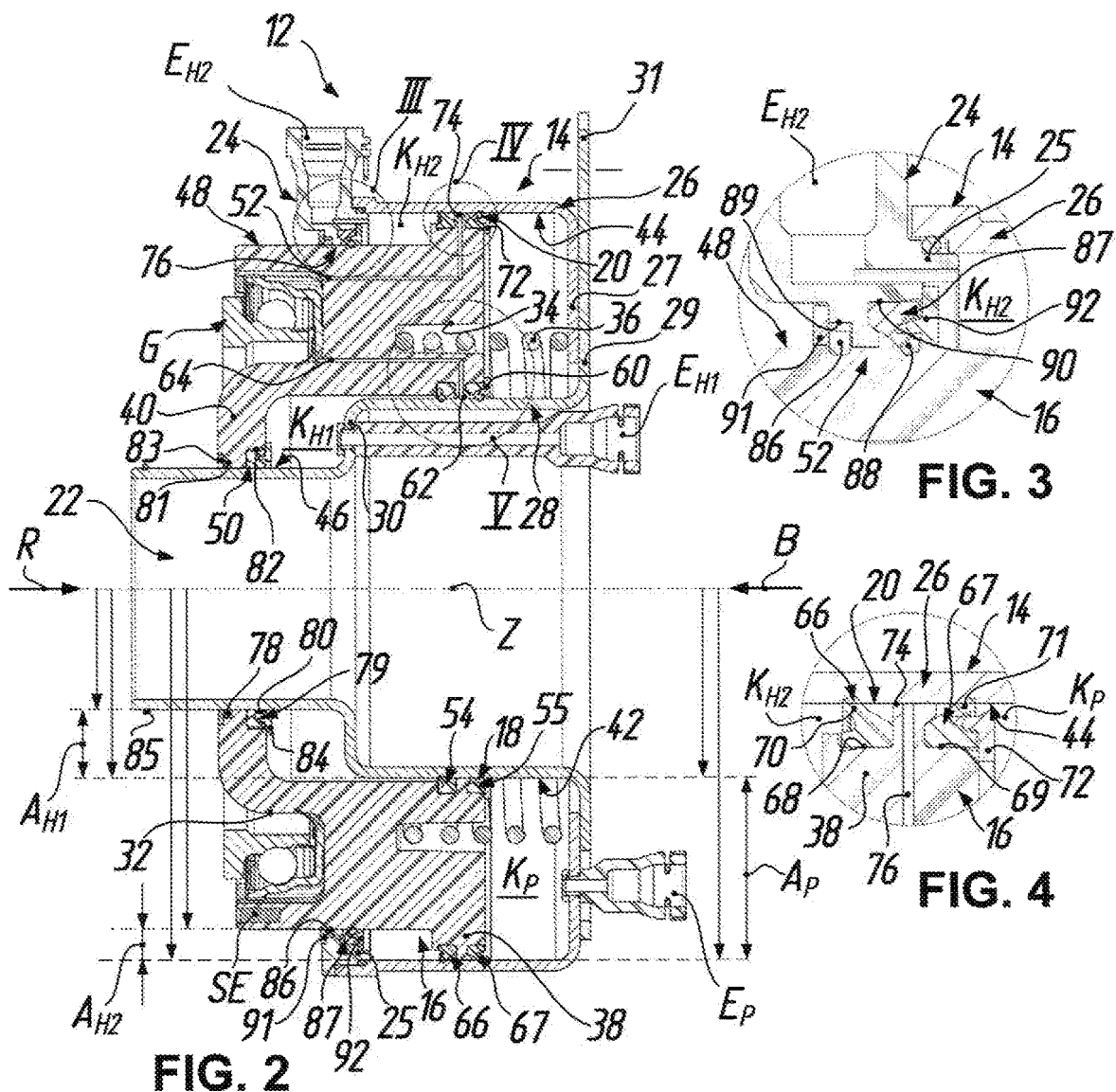
FIG. 2 shows a longitudinal sectional view of the actuator according to FIG. 1, the piston of which by comparison with the state shown in FIG. 1 is disposed in a setting displaced with respect to a cylinder housing of the actuator so as to better illustrate the pressure chambers and effective areas of the actuator.
FIG. 3 shows a part sectional view, to enlarged scale, of the actuator according to FIG. 1 in correspondence with the detail circle III in FIG. 2, for illustration of the sealing situation between a hydraulic pressure chamber of the actuator and the environment.
FIG. 4 shows a part sectional view, to enlarged scale, of the actuator according to FIG. 1 in correspondence with the detail circle IV in FIG. 2, for illustration of the sealing situation between the hydraulic pressure chamber and a pneumatic pressure chamber of the actuator.

The annular piston 16, which also is preferably injection-molded from a plastics material, of the actuator 12 is provided on its end face on the left in FIGS. 1 and 2 with an annular recess 32 serving for reception of the release bearing G. The annular piston 16 has on its end face on the right in FIGS. 1 and 2 a further annular recess 34 forming a bearing for a biasing spring 36, here in the form of a helical compression spring. The biasing spring 36 received in the pneumatic chamber $K_P$ of the actuator 12 is supported at the right in FIGS. 1 and 2 on the annular flange 27 of the second housing section 26 and serves the purpose of providing defined biasing of the release bearing G in the actuating direction B by way of the annular piston 16. As FIGS. 1 and 2 additionally show, the annular piston 16 is formed to be stepped at the outer circumference, more precisely provided at its end, which is on the right in these figures, at the outer circumference with an outer collar 38 and at its end, which is on the left in these figures, at the inner circumference with an inner collar 40.

As a result, in the actuator 12—in an axially very compact mode of construction—one ($K_{H2}$) of the hydraulic chambers is formed at the outer circumference of the annular piston 16 and the other one ($K_{H1}$) of the hydraulic chambers at the inner circumference of the annular piston 16, whereas the pneumatic chamber $K_P$ is disposed at the end with respect to the annular piston 16. In detail, as can be best seen in FIG. 2, the first hydraulic chamber $K_{H1}$ at the inner circumference is bounded axially by the inner collar 40 of the annular piston 16 (on the left) and the step 30 of the third housing section 28 of the cylinder housing 14 (on the right) and radially by the outer circumferential surface of the third housing section 28 (inwardly) and the inner circumferential surface of the annular piston 16 (outwardly). The second hydraulic chamber $K_{H2}$ is bounded axially by the fixing shoulder 25 of the first housing section 24 of the cylinder housing 14 (on the left) and the outer collar 38 of the annular piston 16 (on the right) and radially by the outer circumferential surface of the annular piston 16 (inwardly) and the inner circumferential surface of the second housing section 26 of the cylinder housing 14 (outwardly). Finally, the pneumatic chamber $K_P$ is bounded axially by the end face, which is on the right in FIG. 2, of the annular piston 16 (on the left) and the annular flanges 27, 29 of the second and third housing sections 26, 28 of the cylinder housing 14 (on the right) and radially by the outer circumferential surface of the third housing section 28 of the cylinder housing 14 (inwardly) and by the inner circumferential surface of the second housing section 26 of the cylinder housing 14 (outwardly).

In that case the actuator 12 has a total of four sealing guide surfaces, namely a first sealing guide surface 42 at the outer circumference of the third housing section 28 of the cylinder housing 14 on the right of the step 30, a second sealing guide surface 44 at the inner circumference of the second housing section 26 of the cylinder housing 14, a third sealing guide surface 46 at the outer circumference of the third housing section 28 of the cylinder housing 14 on the left of the step 30 and a fourth sealing guide surface 48 at the outer circumference of the annular piston 16 on the left of the outer collar 38. Whereas the afore-mentioned first sealing arrangement 18 co-operates with the first sealing guide surface 42, the second sealing arrangement 20 already discussed further above co-operates with the second sealing guide surface 44. In analogous manner, a third sealing arrangement 50 at the annular piston 16 is associated with the third sealing guide surface 46 at the cylinder housing 14 and a fourth sealing arrangement 52 at the cylinder housing 14 is associated with the fourth sealing guide surface 48 at the annular piston 16.

Figure 5:
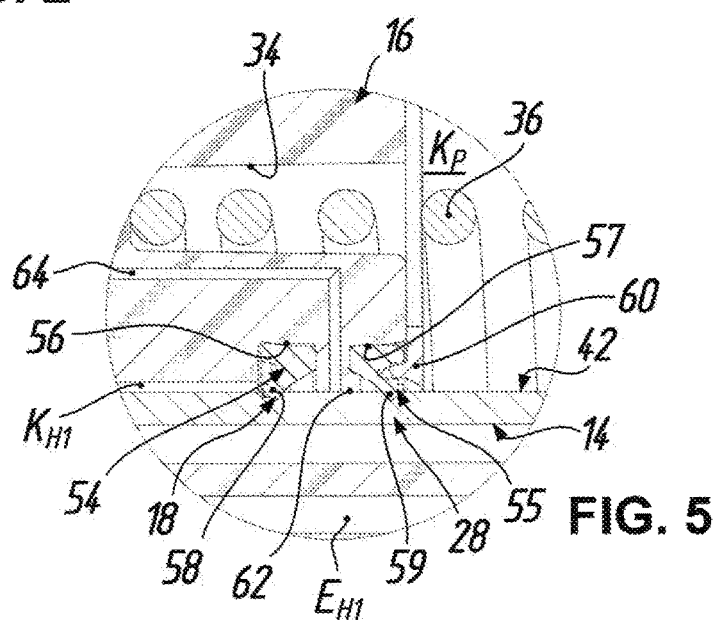
FIG. 5 shows a part sectional view, to enlarged scale, of the actuator according to FIG. 1 in correspondence with the detail circle V in FIG. 2, for illustration of the sealing situation between the pneumatic pressure chamber and a further hydraulic pressure chamber of the actuator.

The first sealing arrangement 18 seals between the first hydraulic chamber $K_{H1}$ and the pneumatic chamber $K_P$ and for that purpose, as can be best seen in FIGS. 2 and 5, is arranged at the inner circumference at the annular piston 16 near the end face thereof at the right in the figures. The first sealing arrangement 18 has two sealing elements which are axially spaced from one another and which in the illustrated embodiment are two grooved rings 54, 55, which according to FIG. 5 are received in associated grooves 56, 57 of the annular piston 16 in such a way that the dynamic sealing lips 58, 59 thereof face away from one another. The groove 56 on the left in FIG. 5 is axially closed, and the groove 57 on the right in FIG. 5 is axially open to the right, which facilitates removal of this seal seat from a mold. In order to retain the grooved ring 55 in the groove 57, a securing ring 60 secured in suitable manner to the annular piston 16, for example by a weld connection, is provided. The grooved rings 54, 55 axially bound an intermediate space 62, which is connected with the environment by way of an equalization channel 64 schematically illustrated in the figures, between the dynamic sealing lips 58, 59.

As best inferred from FIGS. 2 and 4, the second sealing arrangement 20 seals between the second hydraulic chamber $K_{H2}$ and the pneumatic chamber $K_P$ and for that purpose is arranged at the outer circumference at the outer collar 38 of the annular piston 16. The second sealing arrangement 20 also comprises two sealing elements axially spaced from one another and, in particular, again two grooved rings 66, 67 which according to FIG. 4 are inserted into associated grooves 68, 69 in the outer collar 38 of the annular piston 16 in such a way that their dynamic sealing lips 70, 71 point in opposite directions. Here, too, the groove 68 on the left in FIG. 4 is formed to be axially closed, whereas the groove 69 on the right in FIG. 4 is axially open to the right. In order to retain the grooved ring 67 in the groove 69 a further securing ring 72, which is mounted on the annular piston 16, is provided in correspondence with the securing ring 60. The grooved rings 66, 67 bound a further intermediate space 74 axially between the dynamic sealing lips 70, 71, which intermediate space is similarly connected with the environment by means of a further equalization channel 76 schematically illustrated in the figures.

According to FIGS. 1 and 2 the third sealing arrangement 50, which seals between the first hydraulic chamber $K_{H1}$ and the environment, is provided at the inner circumference at the inner collar 40 of the annular piston 16. The third sealing arrangement 50 comprises a stripper ring 78 arranged towards the environment and, on the side of the first hydraulic chamber $K_{H1}$, a further grooved ring 79, the dynamic sealing lip 80 of which faces towards the first hydraulic chamber $K_{H1}$. The stripper ring 78 and the grooved ring 79 are each seated in an axially open groove 81, 82 of the inner collar 40 and are each retained therein by a respective securing ring 83, 84. The securing ring 83 also co-operates with a snap ring 85, which is mounted at the outer circumference of the third housing section 28 near the end thereof at the left in the figures, in order to retain the annular piston 16 at the third housing section 28 before the cylinder housing 14 is completed by joining the first housing section 24 to the second housing section 26.

In addition, the fourth sealing arrangement 52 seals between the second hydraulic chamber $K_{H2}$ and the environment and according to FIGS. 2 and 3 is for that purpose arranged at the inner circumference at the first housing section 24 of the cylinder housing 14. The fourth sealing arrangement 52 comprises a stripper ring 86 provided towards the environment and a grooved ring 87, which is arranged on the side of the second hydraulic chamber $K_{H2}$ and the dynamic sealing lip 88 of which points towards the second hydraulic chamber $K_{H2}$. In analogous manner to the design in the case of the third sealing arrangement 50, according to FIG. 3 the stripper ring 86 and the grooved ring 87 are each seated in a respective axially open groove 89, 90 of the first housing section 24 and are each retained in the respective position thereof by a respective securing ring 91, 92 mounted on the first housing section 24.

In addition, in FIG. 2 it is illustrated by arrows perpendicular to the center axis Z how the effective areas $A_P$, $A_{H1}$, $A_{H2}$, which axially bound the respective chambers $K_P$, $K_{H1}$, $K_{H2}$ in the actuator 12 and which in this embodiment are all circularly annular, arise in terms of size. The first hydraulic effective area $A_{H1}$ of the first hydraulic chamber $K_{H1}$ is accordingly the difference area of a circular area formed by the radius of the first sealing guide surface 42 at the third housing section 28 of the cylinder housing 14 and a circular area formed by the radius of the third sealing guide surface 46 at the third housing section 28. The second hydraulic effective area $A_{H2}$ of the second hydraulic chamber $K_{H2}$ is accordingly the difference area of a circular area formed by the radius of the second sealing guide surface 44 at the second housing section 26 of the cylinder housing 14 and a circular area formed by the radius of the fourth sealing guide surface 48 at the outer circumference of the annular piston 16. Finally, the largest-area pneumatic effective area $A_P$ of the pneumatic chamber $K_P$ is the difference area of a circular area formed by the radius of the second sealing guide surface 44 at the second housing section 26 of the cylinder housing 14 and a circular area formed by the radius of the first sealing guide surface 42 at the third housing section 28 of the cylinder housing 14.

The operation of the device 10 is explained in more detail in the following in which the control CPU suitably activates and co-ordinates the 3/2-way switching valve $V_P$ as well as the first and second 2/2-way proportional valves $V_{H1}$, $V_{H2}$ inter alia in dependence on the position signals detected by the sensor arrangement (position sensor PS, signal element SE) at the actuator 12. In addition, the control CPU obtains default settings from a superordinate transmission electronic system (TCU; not shown in the figures) by way of a suitable bus system (CAN, LIN, FlexRay or the like) or, for example, default settings from a travel or angle sensor of a clutch pedal with a pedal force simulator (similarly not illustrated), depending on the respective use of the device 10.

In order to actuate the clutch, the control CPU initially activates the 3/2-way switching valve $V_P$ in order to connect the compressed air source $Q_P$ with the pneumatic chamber $K_P$ in the actuator 12, whereby the compressed air is applied directly to the pneumatic effective area $A_P$, which in the cylinder housing 14 actively initiates a movement of the annular piston 16 in the actuating direction B. As a consequence of this movement of the annular piston 16 the hydraulic fluid, which is present in the second hydraulic chamber $K_{H2}$ of the actuator 12, is displaced in the direction of the reservoir $Q_H$. At the same time, the second 2/2-way proportional valve $V_{H2}$ associated with the second hydraulic effective area $A_{H2}$ is subjected by the control CPU to preliminary current supply at a value which fully closes it so that there is passive build-up in the second hydraulic chamber $K_{H2}$ of the actuator 12 of a hydraulic pressure which acts on the second hydraulic effective area $A_{H2}$ and in that case generates thereat a force in restoring direction R and thus brakes or seeks to stop the movement of the annular piston 16 in the actuating direction B. The first hydraulic chamber $K_{H1}$ in the cylinder housing 14 increases in size in company with the movement of the annular piston 16 in the actuating direction B, whereby hydraulic fluid is sucked out or flows on out of the reservoir $Q_H$ by way of the first 2/2-way proportional valve $V_{H1}$, which is not supplied with current, i.e. here is open.

The movement travel of the annular piston 16 in the cylinder housing 14 is now regulated in a closed loop by the control CPU in accordance with the default settings from the superordinate transmission electronic system (TCU) as well as the actual positions, which are detected by way of the sensor arrangement at the actuator 12, of the annular piston 16 by reduction of the current at the second 2/2-way proportional valve $V_{H2}$. In that case, the second 2/2-way proportional valve $V_{H2}$ is opened in defined manner, as a result of which a hydraulic (backpressure in the second hydraulic chamber $K_{H2}$ arises as a function of the respectively open valve cross-section (throttle gap), which pressure—acting on the second hydraulic effective area $A_{H2}$—brakes the pneumatically constrained movement of the annular piston 16 in the cylinder housing 14 to a greater or lesser extent.

In the equilibrium state (a=b+c), (a) the air pressure, which is provided by the compressed air source $Q_P$, multiplied by the pneumatic effective area $A_P$ at the annular piston 16 is equal to the sum of (b) the hydraulic pressure, which arises in the second hydraulic chamber $K_{H2}$ of the actuator 12 as a consequence of the obstructing second 2/2-way proportional valve $V_{H2}$, multiplied by the second hydraulic effective area $A_{H2}$ at the annular piston 16 and (c) the spring force of the clutch. In practice, the ratio of the pneumatic pressure to the hydraulic pressure is, for example, approximately 1 to 6, with up to 8 bars air pressure and up to 50 bars of hydraulic pressure. Given these rules, the travel speed of the annular piston 16 in the actuator 12 can be selectively set from maximum possible speed towards standstill of the annular piston 16 in the cylinder housing 14 and also any intermediate positions of the annular piston 16 can be maintained. When a desired position of the annular piston 16 in the cylinder housing 14 is reached, the second 2/2-way proportional valve $V_{H2}$ is fully supplied with current and thus closed, so that the movement of the annular piston 16 is stopped.

For the actual movement regulation (travel speed and position) the known characteristic of the clutch concerned and the pressures acting on the active effective areas of the actuator 12 can be used in addition to the position signal of the position sensor PS integrated in the actuator 12. These pressures can in that case be ascertained either directly by way of pressure sensors (not illustrated in the figures) or indirectly in the case of the compressed air by way of the bus system and in the case of the hydraulic pressure by way of the current of the respectively active regulating valve $V_{H2}$ (or $V_{H1}$).

If there should be over-travel of the predetermined position of the annular piston 16 in the cylinder housing 14 or if the annular piston 16 is to be moved back into its initial or rest setting the first 2/2-way proportional valve $V_{H1}$ is subject to preliminary current supply to an appropriate value and the compressed air switched off, i.e. the supply of current to the 3/2-way switching valve $V_P$ is ended, as then also the supply of current to the second 2/2-way proportional valve $V_{H2}$. As a consequence thereof the spring force of the clutch pushes, byway of the setting element G, the annular piston 16 in restoring direction R, in which case this rearward movement—analogously to the movement in actuating direction B—can be braked in defined manner or stopped by suitable supply of current to the first 2/2-way proportional valve $V_{H1}$. There is then build-up in the first hydraulic chamber $K_{H1}$ as a function of the open valve cross-section of the first 2/2-way proportional valve $V_{H1}$ of a pressure which acts on the first hydraulic effective area $A_{H1}$ and thus presents resistance to the rearward movement of the annular piston 16 in the cylinder housing 14. At the same time hydraulic fluid flows on by way of the open second 2/2-way proportional valve $V_{H2}$ from the reservoir $Q_H$ into the second hydraulic chamber $K_{H2}$ of the actuator 12. When the desired position of the annular piston 16 is again reached this can be maintained by closing the two 2/2-way proportional valves $V_{H1}$, $V_{H2}$. A further rearward movement of the annular piston 16 into its initial setting can finally take place in controlled manner, with current-free 3/2-way switching valve $V_P$ and current-free second 2/2-way proportional valve $V_{H2}$, by suitable supply of current to the first 2/2-way proportional valve $V_{H1}$.

FIGS. 6 to 9 show further embodiments of the device 10 with the afore-described actuator 12, which shall be described in the following only to the extent that they differ from the device 10 explained above with reference to FIGS. 1 to 5. In that regard, it will be apparent to one of ordinary skill in the art that the respective other measures and features can optionally also be provided in combination without always having to be mentioned individually in the following.

Figure 6:
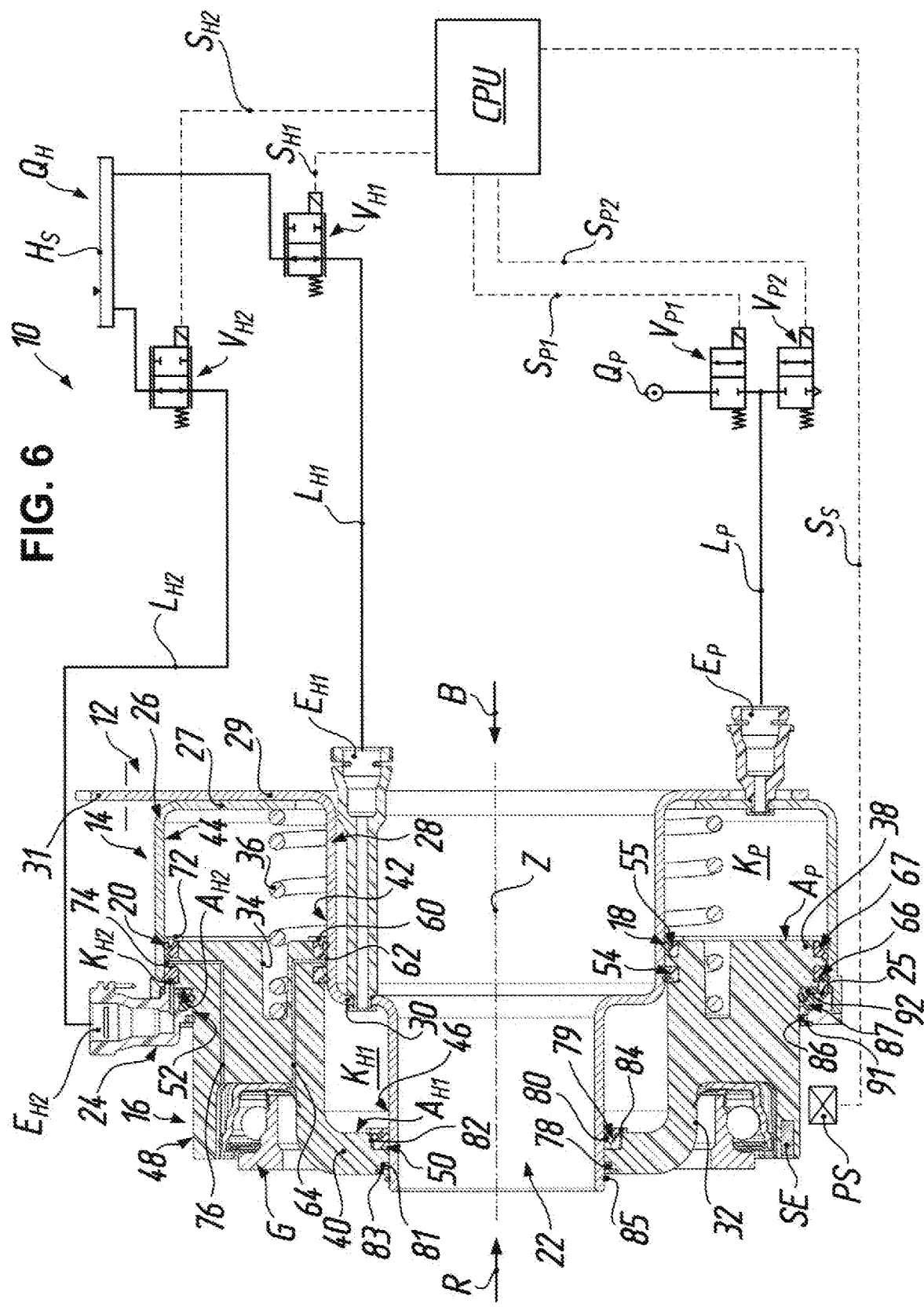
FIG. 6 shows a circuit diagram of a device for actuation of a clutch in a motor vehicle as a second embodiment, again with the actuator, which is illustrated in a longitudinal sectional view, according to the invention of FIG. 1, wherein the pneumatic pressure chamber of the actuator is, in distinction from FIG. 1, connected with the compressed air source and the environment by way of, respectively, two 2/2-way switching valves.

In the device 10 according to FIG. 6, the pneumatic activation of the actuator 12 is different from the case of the device 10 according to FIG. 1. Instead of the 3/2-way switching valve $V_P$ of FIG. 1, two switching valves $V_{P1}$, $V_{P2}$ are provided. More precisely, connected between the compressed air source $Q_P$ and the pneumatic chamber $K_P$ of the actuator 12 is a spring-biased and electromagnetically actuable first 2/2-way switching valve $V_{P1}$ which can be activated by the control CPU via a control line $S_{P1}$ and in the state of activation by the control CPU connects the compressed air source $Q_P$ with the pneumatic chamber $K_P$. In addition, connected between the pneumatic chamber $K_P$ and the environment is a spring-biased and electromagnetically actuable second 2/2-way switching valve $V_{P2}$ which can similarly be activated by means-of the control CPU via a control line $S_{P2}$ and in the state of activation by the control CPU connects the pneumatic chamber $K_P$ with the environment (indicated at the bottom left at the valve $V_{P2}$ by the triangle). As a consequence of this design of the switching valves $V_{P1}$, $V_{P2}$ with spring-biasing into the blocking/zero setting the respective compressed air state is maintained when current is switched off by way of the control CPU, which, for example, in an operating state of the actuator 12 for maintaining a specific position of the setting element G is very advantageous with respect to energy efficiency.

Figure 7:
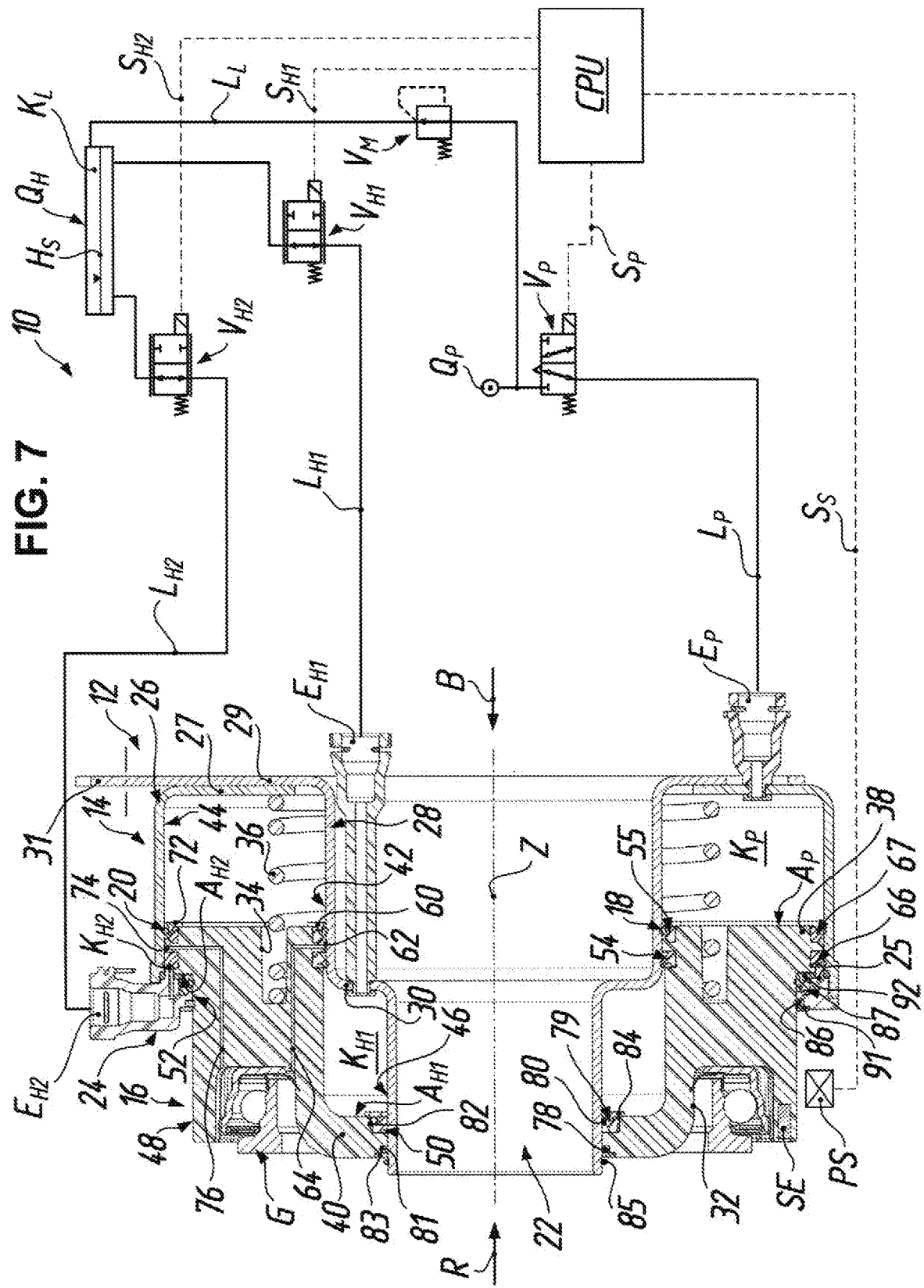
FIG. 7 shows a circuit diagram of a device for actuation of a clutch in a motor vehicle as a third embodiment, again with the actuator, which is illustrated in a longitudinal sectional view, according to the invention in accordance with FIG. 1, wherein by contrast to FIG. 1 an air chamber, which is present above a liquid level in the closed-construction reservoir for hydraulic fluid, is connected with the compressed air source by way of a pressure-reducing valve.

The device 10 according to FIG. 7 differs from the device 10 according to FIG. 1 in that the reservoir $Q_H$ for the hydraulic fluid is constructed to be closed, so that an air chamber $K_L$ remains above a liquid level $H_S$ of the hydraulic fluid in the reservoir $Q_H$. Moreover, this air chamber $K_L$ is connected with the compressed air source $Q_P$ by way of an air line $L_L$ with a pressure-reducing valve $V_M$, whereby the hydraulic fluid in the reservoir $Q_H$ is acted on by a biasing pressure greater than atmospheric pressure. This measure assists or facilitates filling of the respective unloaded hydraulic branch—thus in the case of displacement of the annular piston 16 in actuating direction B the filling of the first hydraulic line $L_{H1}$ as well as the first hydraulic chamber $K_{H1}$ in the actuator 12 and in the case of displacement of the annular piston 16 in restoring direction R the filling of the second hydraulic line $L_{H2}$ as well as the second hydraulic chamber $K_{H2}$ in the actuator 12—and additionally ensures a specific biasing of the respective hydraulic seals (grooved rings 54, 79 at the first hydraulic chamber $K_{H1}$ or grooved rings 66, 87 at the second hydraulic chamber $K_{H2}$). As a result, through such a pressure biasing, which increases the stiffness of the hydraulic system, of the reservoir $Q_H$ it is possible to improve, in particular, the reaction of the actuator 12 with respect to reaction speed and setting accuracy when switching over the movement direction from actuating direction B to restoring direction R or conversely.

Figure 8:
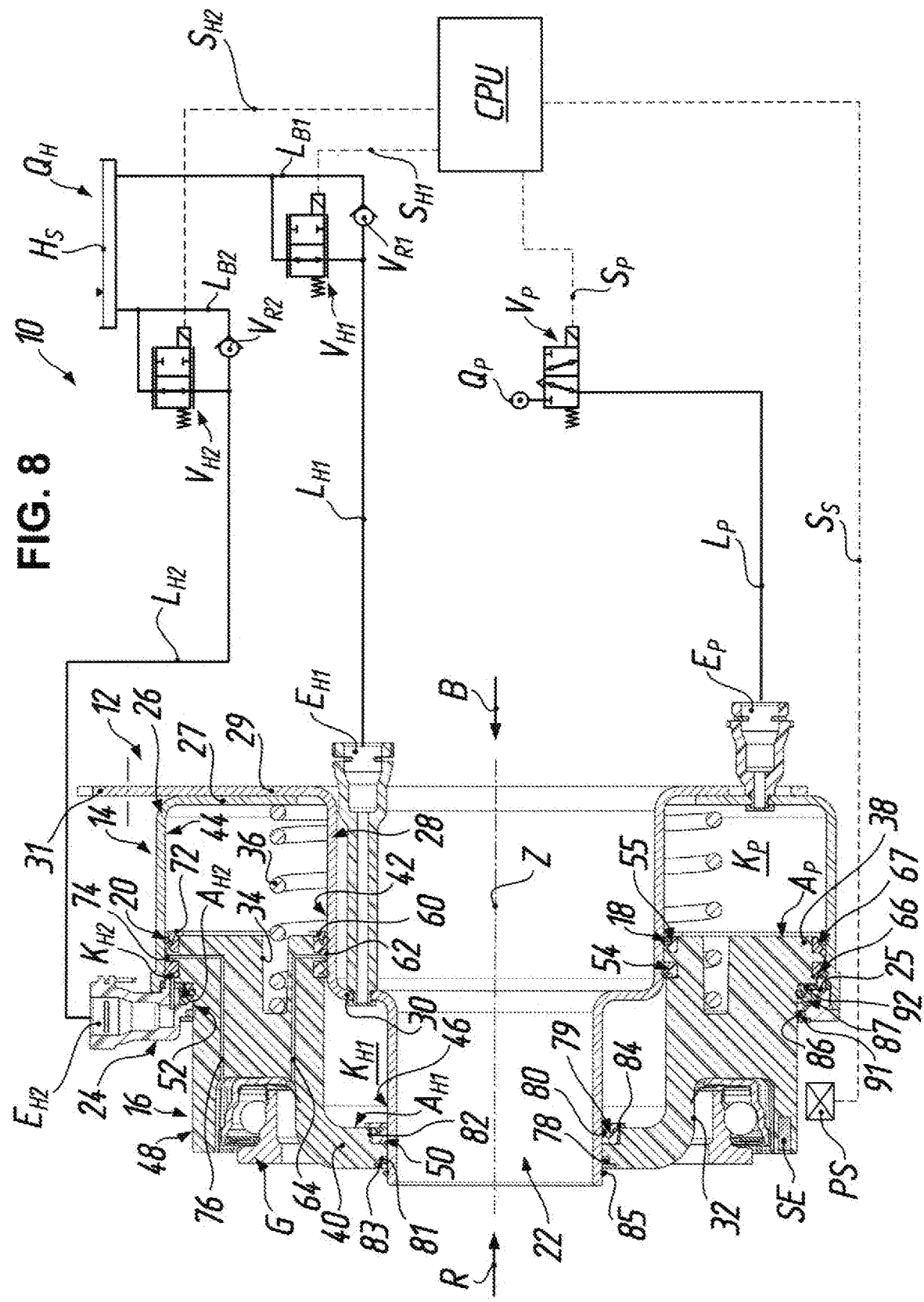
FIG. 8 shows a circuit diagram of a device for actuation of a clutch in a motor vehicle as a fourth embodiment, once more with the actuator, which is illustrated in a longitudinal sectional view, according to the invention of FIG. 1, wherein by contrast to FIG. 1 a bypass line with a bypass non-return valve, which blocks in direction from the actuator to the reservoir, is connected in parallel with each 2/2-way proportional valve.
Figure 9:
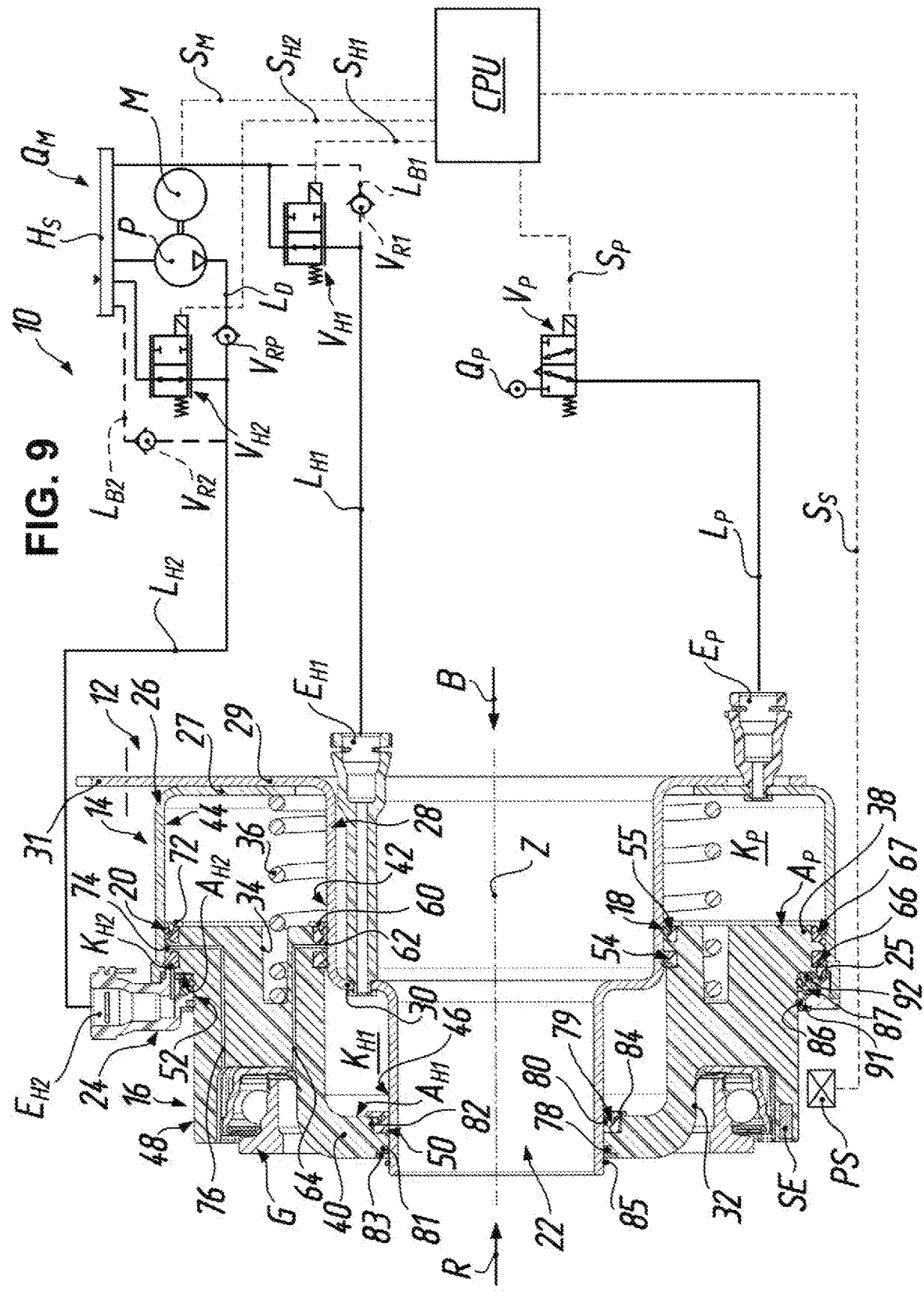
FIG. 9 shows a circuit diagram of a device for actuation of a clutch in a motor vehicle as a fifth embodiment, yet again with the actuator, which is illustrated in a longitudinal sectional view, according to the invention in accordance with FIG. 1, wherein—optionally in addition to the bypass measures of FIG. 8 (here illustrated in dashed lines)—for active hydraulic pressure loading of the actuator there is connected in parallel with one of the 2/2-way proportional valves a pump line with an electric-motor driven hydraulic pump and a pump non-return valve provided at the pump outlet side and blocking towards the hydraulic pump.

In the case of the device 10 according to FIG. 8—and optionally (dashed lines) in the case of the device 10 according to FIG. 9—by comparison with the device 10 according to FIG. 1 a respective bypass line $L_{B1}$, $L_{B2}$ with a bypass non-return valve $V_{R1}$, $V_{R2}$, which blocks in direction from the actuator 12 to the reservoir $Q_H$, is connected in parallel with each of the first and second 2/2-way proportional valves $V_{H1}$, $V_{H2}$. This extension of the device 10 makes it possible to 'carry along' the respective unloaded 2/2-way proportional valve $V_{H1}$ or $V_{H2}$ in the hydraulic system: in order to be able to very precisely maintain the position of the setting element G in the case of movement reversal (from actuating direction B to restoring direction R or conversely) the respective unloaded or 'non-braking' valve—i.e. in the case of movement of the annular piston 16 in the actuating direction B the first 2/2-way proportional valve $V_{H1}$ and in the case of movement of the annular piston 16 in the restoring direction R the second 2/2-way proportional valve $V_{H2}$—is supplied continuously or also only in situations in which a reversal of movement may be required with preliminary current at a specific current value, thus part-closed in defined manner. The movement in the changed movement direction can thus be carried out promptly in controlled manner without requiring a more lengthy regulating process for that purpose. The bypass non-return valves $V_{R1}$, $V_{R2}$ in that case enable supply of the respective unloaded hydraulic branch with hydraulic fluid past the respective 2/2-way proportional valve $V_{H1}$ or $V_{H2}$ with preliminary supply of current.

The device 10 according to FIG. 9 additionally differs from the device 10 according to FIG. 1 in that a pump line $L_D$ with an electric-motor (electric motor M) drivable hydraulic pump P and a pump non-return valve $V_{RP}$, which is arranged at the pump outlet side and which blocks towards the hydraulic pump P, is connected in parallel with the second 2/2-way proportional valve $V_{H2}$. In that case, the hydraulic pump P—more precisely the electric motor M thereof—can be activated by the control CPU by way of a control line $S_M$ in order to selectably actively load the second hydraulic chamber $K_{H2}$ of the actuator 12 with a hydraulic pressure. The use of the hydraulic pump P enables generation of a movement in restoring direction R, i.e. opposite to the direction of the air pressure (actuating direction B), and permits fine regulation of the actuator movements. Thus, for example, it is possible to produce at the clutch by appropriate reciprocating movement of the setting element G a so-called 'micro-slip' serving the purpose of balancing out rotational angle non-uniformities under conversion of vibration energy into thermal energy and thus to keep torsional vibrations away from the transmission. The hydraulic pump P can then be kept very small in conveying volume, because the dynamic, which is required for generating micro-slip, of the hydraulic pressure is not large.

Figure 10:
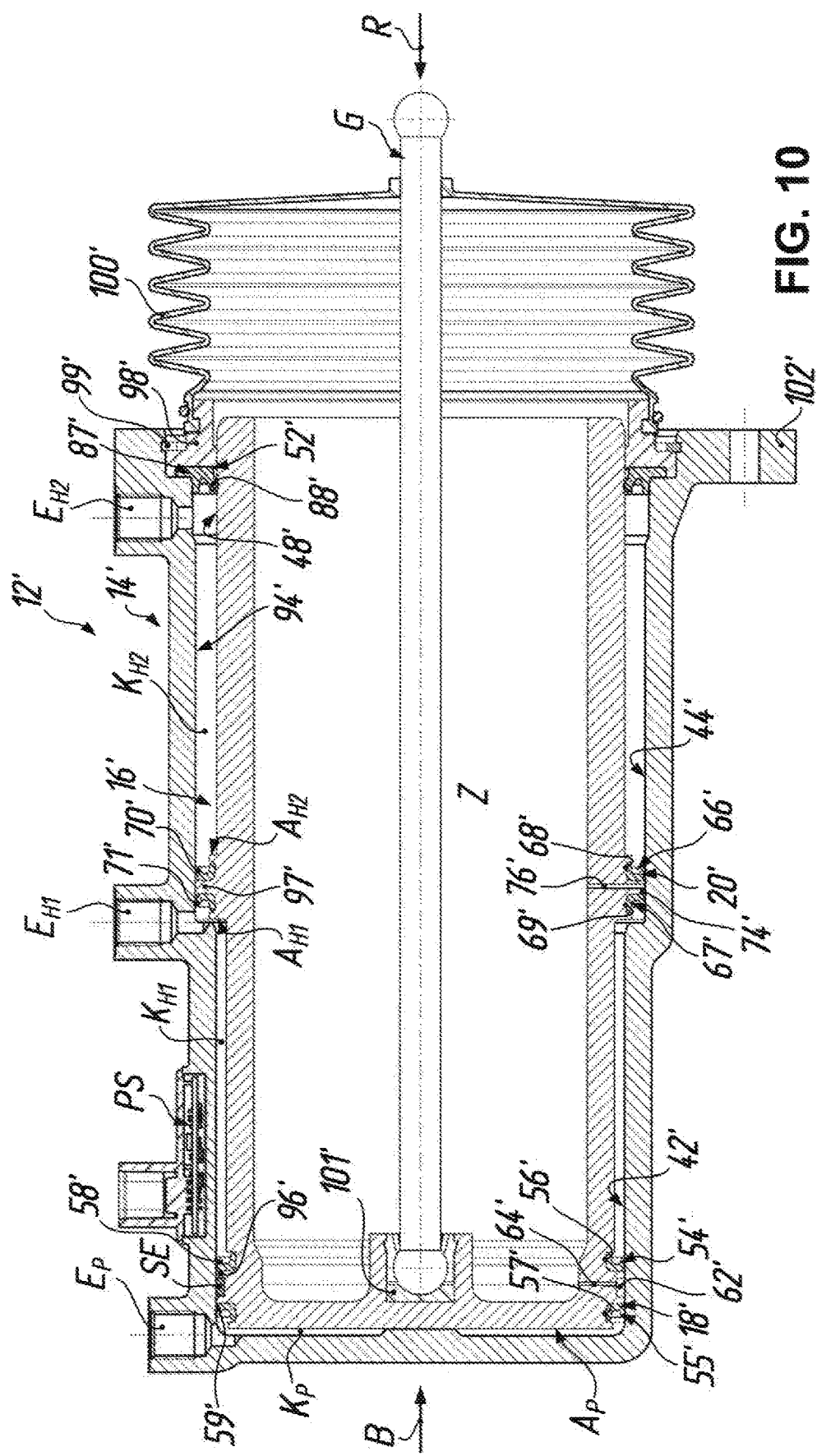
FIG. 10 shows a longitudinal sectional view of an actuator in accordance with a second variant, according to the invention, which can be employed with each of the devices according to the first to fifth embodiments in accordance with FIGS. 1 and 6 to 9 and which is constructed in the form of a clutch slave cylinder with a central blind bore in the cylinder housing and is shown in a basic setting, wherein two hydraulic chambers lying axially one behind the other are provided at the outer circumference of the piston and the pneumatic chamber is disposed at the end with respect to the piston.
Figure 11:
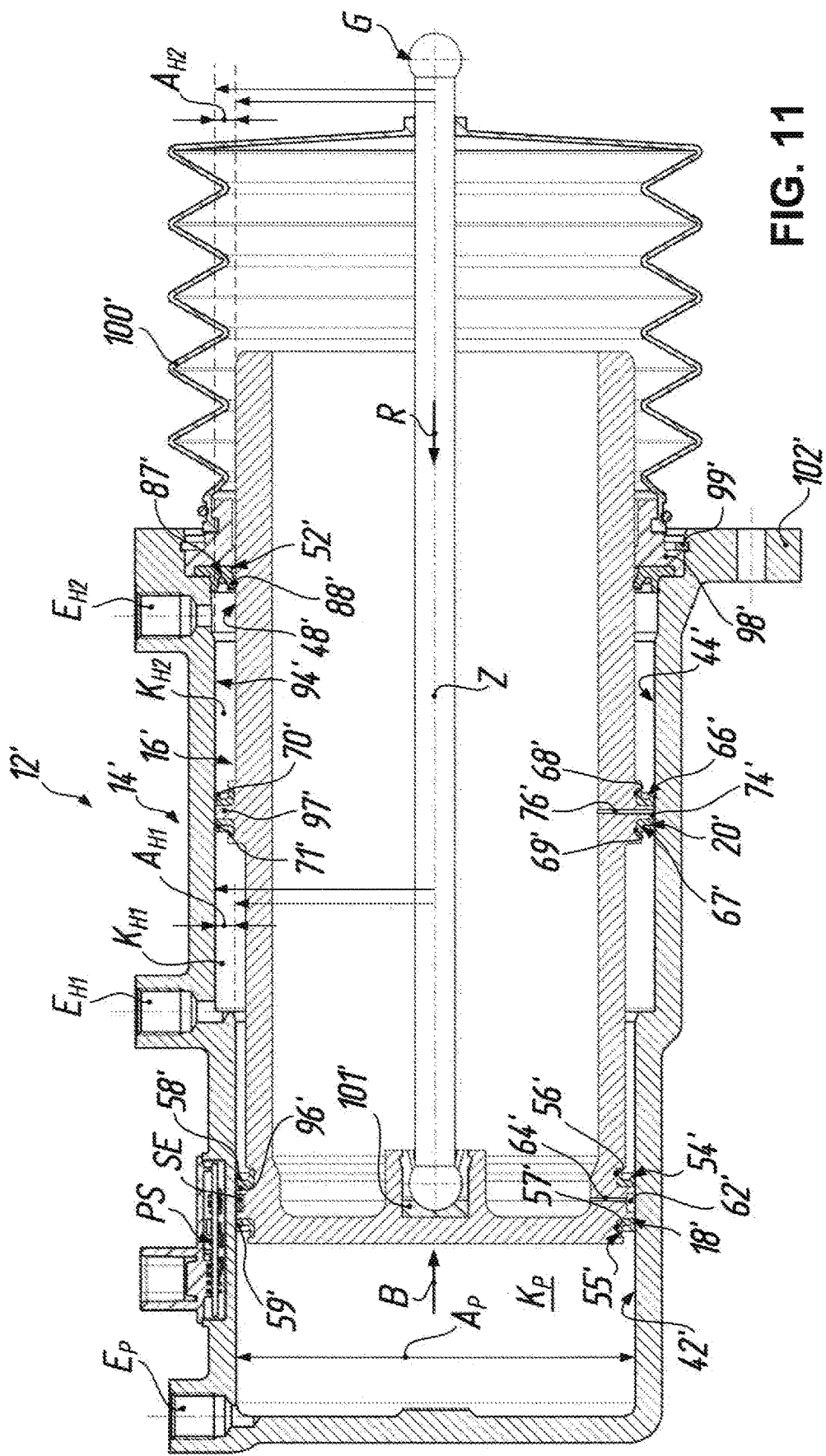
FIG. 11 shows a longitudinal sectional view of the actuator in accordance with the second variant, which is according to the invention, in accordance with FIG. 10, the piston of which by comparison with the state illustrated in FIG. 10 is disposed in a setting displaced with respect to the cylinder housing of the actuator so as to better illustrate the pressure chambers and effective areas of the actuator.
Figure 12:
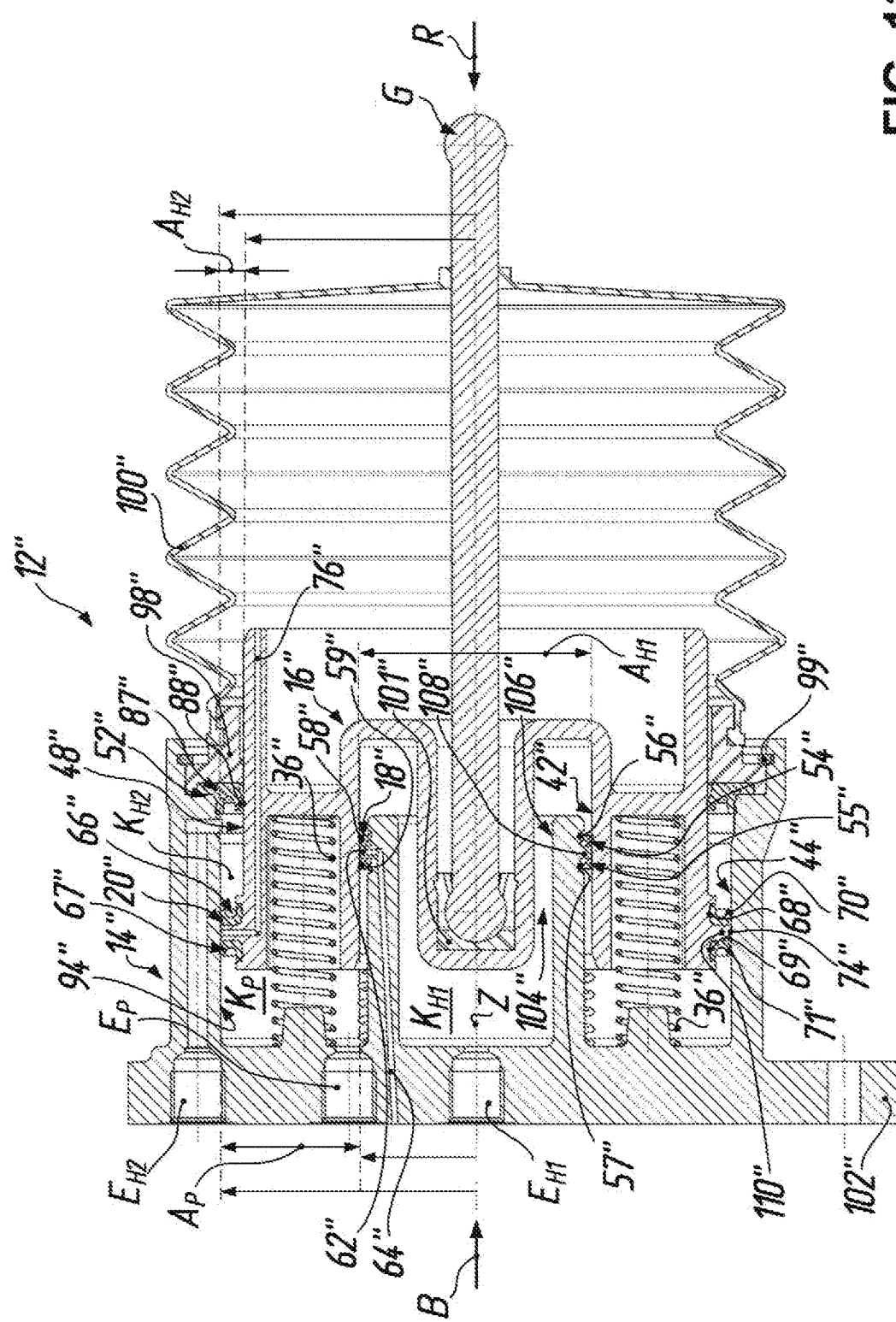
FIG. 12 shows a longitudinal section view of an actuator in accordance with a third variant according to the invention, which can similarly be employed in each of the devices according to the first to fifth embodiments in accordance with FIGS. 1 and 6 to 9 and which is illustrated in an operating setting, wherein—in distinction from the actuator according to the second variant in accordance with FIG. 11—the piston of the actuator has a recess into which a projection provided at the cylinder housing enters so that one of the hydraulic chambers is formed between the projection and the recess and another one of the hydraulic chambers is disposed at the outer circumference of the piston, the pneumatic chamber being disposed at the end with respect to the piston.

FIGS. 10 to 12 show further variants of an actuator 12', 12" for a device 10 for clutch actuation in a motor vehicle, which shall be described in the following only to the extent that they significantly differ from the actuator 12 described above with reference to FIGS. 1 to 5 and to the extent appearing necessary for understanding the present invention. These actuator variants 12', 12" with their effective areas $A_{H1}$, $A_{H2}$, $A_P$, pressure chambers $K_{H1}$, $K_{H2}$, $K_P$ and pressure connections $E_{H1}$, $E_{H2}$, $E_P$ can, of course, be used in each of the devices 10 according to FIGS. 1 and 6 to 9. In that regard, it is common to the further actuator variants 12' (FIGS. 10 and 11) and 12" (FIG. 12) that by contrast to the afore-described actuator 12 they are not designed in the manner of a central release device. Instead, these actuators 12', 12" are constructed in the manner of a conventional clutch slave cylinder with a central blind bore 94', 94", in which the non-annular piston 16', 16" is received to be longitudinally displaceable, in the cylinder housing 14', 14", the piston being in actuation-effective connection with a central piston rod as setting element G.

In the actuator 12' according to FIGS. 10 and 11 the two hydraulic chambers $K_{H1}$, $K_{H2}$ are formed in the actuator 12' to lie axially one behind the other at the outer circumference of the piston 16', whereas the pneumatic chamber $K_P$ lies at the end with respect to the piston 16', i.e. at the left of the piston 16' in FIGS. 10 and 11. For that purpose, the cylinder housing 14', which is metallic in the illustrated embodiment, is formed with multiple stepping at the inner circumference, i.e. in the blind bore 94', for formation of the sealing guide surfaces 42', 44' for the sealing arrangements 18', 20', whereas the substantially hollow-cylindrical piston 16' is stepped at the outer circumference and provided with two collars 96', 97 which carry the sealing arrangements 18', 20'. The grooved rings 54', 55' of the first sealing arrangement 18' are in that case seated in radial grooves 56', 57, which are formed at the collar 96', of the piston 16', whereas the grooved rings 66', 67' of the second sealing arrangement 20' are received in radial grooves 68', 69' formed at the collar 97. The first sealing arrangement 18' thus seals between the pneumatic chamber $K_P$ and the first hydraulic chamber $K_{H1}$ and the second sealing arrangement 20' between the first hydraulic chamber $K_{H1}$ and the second hydraulic chamber $K_{H2}$. The sealing arrangement 52' which seals the second hydraulic chamber $K_{H2}$ relative to the environment is fixed to the cylinder housing 14' by an annular part 98', which is made from plastic material, with the assistance of a snap ring 99'. By comparison with the afore-described actuator 12 according to FIGS. 1 to 5, a further sealing arrangement is redundant. The annular part 98' additionally also serves for end fixing of an elastomeric bellows 100' to the cylinder housing 14', the other end of which is joined to the setting elements in the form of a piston rod G, which in turn is pivotably connected by way of a bearing part 101' at a central point in the piston 16' to be angularly movable. Finally, the cylinder housing 14' is provided at its open end with an annular flange 102' serving for securing the actuator 12' in or to the transmission housing (not shown).

The actuator 12" illustrated in FIG. 12 is of significantly shorter construction by comparison with the actuator 12' of FIGS. 10 and 11 and to that extent is more similar to the first actuator variant 12 with respect to constructional space requirement. This is made possible in the case of the actuator 12" by the piston 16" of the actuator 12" having a central recess 104", which is annular—cup-shaped also applies here—in the illustrated embodiment and into which a central and here similarly annular projection 106" provided at the cylinder housing 14" at the base enters. In that case, one ($K_{H1}$) of the cylinder chambers is formed between the projection 106" of the cylinder housing 14" and the recess 104" of the piston 16", whereas another one ($K_{H2}$) of the hydraulic chambers is disposed at the outer circumference of the piston 16". The pneumatic chamber $K_P$ again lies at the end with respect to the piston 16", in which case a plurality of biasing springs 16" arranged in the pneumatic chamber $K_P$ biases the piston 16" relative to the cylinder housing 14" in the actuating direction B. Outer collars 108", 110" at the outer circumference of the projection 106" and at the outer circumference of the piston 16" carry the sealing arrangements 18", 20", which seal between the pneumatic chamber $K_P$ and the first hydraulic chamber $K_{H1}$ (first sealing arrangement 18") or between the pneumatic chamber $K_P$ and the second hydraulic chamber $K_{H2}$ (second sealing arrangement 20"). The sensor arrangement, which for simplification of the illustration is not shown in FIG. 12, can similarly be provided at the actuator 12", with a position sensor fixed relative to the cylinder housing and a signal element suitably mounted on the piston. However, it is also possible to provide the sensor arrangement at a suitable place at the piston rod G or at the clutch downstream of the setting element, which equally applies to the two other actuator variants 12, 12'.

If in correspondence with the respective actuation requirements an even greater pneumatic effective area $A_P$ should be needed at the actuator 12" then it would be possible to provide a further sealing arrangement (not shown) radially within the projection 106" of the cylinder housing 14" between the projection 106" and the inner protrusion, which is provided here and receives the bearing member 101" for the piston rod G, of the piston 16" so as to separate a central, second pneumatic chamber from the first hydraulic chamber $K_{H1}$. The first hydraulic pressure connection $E_{H1}$ would then merely have to be led through the projection 106" to the first hydraulic chamber $K_{H1}$ and a connection be created between the pneumatic chamber $K_P$ and the second pneumatic chamber.

An actuator for a device for clutch actuation in a motor vehicle comprises a cylinder housing, which has a pneumatic pressure connection and at least one hydraulic pressure connection and in which a piston operatively connected with a setting element is received to be longitudinally displaceable. The piston together with the cylinder housing defines a pneumatic chamber able to be loaded with pressure by way of the pneumatic pressure connection and at least one hydraulic chamber connected with the hydraulic pressure connection. The chambers are separated from one another by a sealing arrangement. In a very compact design of the actuator a pneumatic effective area axially bounding the pneumatic chamber and at least one opposite hydraulic effective area axially bounding the hydraulic chamber are formed at the piston so that through pressure loading of the pneumatic chamber the setting element is longitudinally displaceable by way of the piston in an actuating direction against an external restoring force acting in a restoring direction and a piston movement is controllable by build-up of pressure in the at least one hydraulic chamber.

Variations and modifications are possible without departing from the scope and spirit of the present invention as defined by the appended claims.

I claim:

1. An Actuator (12, 12', 12") for a device (10) for clutch actuation in a motor vehicle, with a cylinder housing (14, 14', 14") which has a pneumatic pressure connection ($E_P$) and at least one hydraulic pressure connection ($E_{H1}$, $E_{H2}$) and in which a piston (16, 16', 16") operatively connected with a setting element (G) is received to be longitudinally displaceable, wherein the piston together with the cylinder housing (14, 14', 14") defines a pneumatic chamber ($K_{Ps}$) loadable with pressure by way of the pneumatic pressure connection ($E_P$) and at least one hydraulic chamber ($K_{H1}$, $K_{H2}$) connected with the at least one hydraulic pressure connection ($E_{H1}$, $E_{H2}$), the pneumatic and hydraulic chambers being around a common rotational axis and being separated from one another by a sealing arrangement (18, 20; 18', 20'; 18", 20"), and wherein a pneumatic effective area ($A_P$) axially bounding the pneumatic chamber ($K_P$) and at least one hydraulic effective area ($A_{H2}$) axially bounding the at least one hydraulic chamber ($K_{H2}$) and oriented oppositely to the pneumatic effective area ($A_P$) are formed at the piston (16, 16', 16") so that through loading the pneumatic chamber ($K_P$) with pressure the setting element (G) is longitudinally displaceable by way of the piston (16, 16', 16") in an actuating direction (B) against an external restoring force acting in a restoring direction (R) and piston movement is controllable by build-up of pressure in the at least one hydraulic chamber ($K_{H1}$, $K_{H2}$).

2. An actuator (12, 12', 12") according to claim 1, wherein the cylinder housing (14, 14', 14") has said at least one hydraulic pressure connection being two hydraulic pressure connections ($E_{H1}$, $E_{H2}$) and together with the piston (16, 16', 16") defines in addition to the pneumatic chamber ($K_P$) said at least one hydraulic pressure chamber being two hydraulic chambers ($K_{H1}$, $K_{H2}$) which are each connected with a respective one of the two hydraulic connections ($E_{H1}$, $E_{H2}$) and which are separated from one another and from the pneumatic chamber ($K_P$) by two sealing arrangements (18, 20; 18', 20'; 18", 20"), wherein apart from the pneumatic effective area ($A_P$) two hydraulic effective areas ($A_{H1}$, $A_{H2}$) each axially bounding a respective one of the hydraulic chambers ($K_{H1}$, $K_{H2}$) are formed oppositely to one another at the piston (16, 16', 16") so that movement of the piston (16, 16', 16") in the restoring direction (R) can be braked in controlled manner by build-up of pressure in a first one ($K_{H1}$) of the hydraulic chambers and in the actuating direction (B) can be braked in controlled manner by build-up of pressure in a second one ($K_{H2}$) of the hydraulic chambers.

3. An actuator (12, 12', 12") according to claim 2, wherein the cylinder housing (14, 14', 14") and the piston (16, 16', 16") are formed to be stepped at the circumference for formation of the two hydraulic chambers ($K_{H1}$, $K_{H2}$) and the hydraulic effective area ($A_{H1}$, $A_{H2}$) bounding the latter.

4. An actuator (12) according to claim 3, the actuator being constructed in the form of a central release device, wherein the cylinder housing (14) has in the region of a center axis (Z) a passage (22) for a transmission shaft and the piston received in the cylinder housing (14) to be longitudinally displaceable is an annular piston (16) carrying a release bearing as setting element (G).

5. An actuator (12) according to claim 4, wherein one ($K_{H2}$) of the two hydraulic chambers is formed at the outer circumference of the annular piston (16) and another one ($K_{H1}$) of the hydraulic chambers is formed at the inner circumference of the annular piston (16), the pneumatic chamber ($K_P$) being disposed at the end with respect to the annular piston (16).

6. An actuator (12', 12") according to claim 3, the actuator being constructed in the form of a clutch slave cylinder with a central blind bore (94', 94"), in which the piston (16', 16") is received to be longitudinally displaceable, in the cylinder housing (14', 14"), the piston being in actuation-effective connection with a central piston rod as setting element (G).

7. An actuator (12') according to claim 6, wherein the two hydraulic chambers ($K_{H1}$, $K_{H2}$) are formed at the outer circumference of the piston (16') to be disposed axially one behind the other, the pneumatic chamber ($K_P$) being disposed at the end with respect to the piston (16').

8. An actuator (12") according to claim 6, wherein the piston (16") has a central recess (104") into which a central projection (106") provided at the cylinder housing (14") enters, and wherein one ($K_{H1}$) of the two hydraulic chambers is formed between the projection (106") of the cylinder housing (14") and the recess (104") of the piston (16") and the other ($K_{H2}$) of the two hydraulic chambers is disposed at the outer circumference of the piston (16"), the pneumatic chamber ($K_P$) being disposed at the end with respect to the piston (16").

9. An actuator (12, 12', 12") according claim 3, wherein at least the sealing arrangement (18, 20; 18'; 18", 20") separating the pneumatic chamber ($K_P$) from the respective hydraulic chamber ($K_{H1}$, $K_{H2}$) comprises two axially spaced-apart sealing elements (54, 55, 66, 67; 54', 55', 66', 67'; 54", 55", 66", 67") with an intermediate space (62, 74; 62', 74'; 62", 74") therebetween, the intermediate space being connected with the environment by way of an equalization channel (64, 76; 64', 76'; 64", 76").

10. An actuator (12, 12', 12") according to claim 1, wherein the cylinder housing (14, 14', 14") and the piston (16, 16', 16") are formed to be stepped at the circumference for formation of the at least one hydraulic chamber ($K_{H1}$, $K_{H2}$) and the hydraulic effective area ($A_{H1}$, $A_{H2}$) bounding the latter.

11. An actuator (12) according to claim 2, the actuator being constructed in the form of a central release device, wherein the cylinder housing (14) has in the region of a center axis (Z) a passage (22) for a transmission shaft and the piston received in the cylinder housing (14) to be longitudinally displaceable is an annular piston (16) carrying a release bearing as setting element (G).

12. An actuator (12) according to claim 1, wherein one ($K_{H2}$) of the hydraulic chambers is formed at the outer circumference of the annular piston (16) and another one ($K_{H1}$) of the hydraulic chambers is formed at the inner circumference of the annular piston (16), the pneumatic chamber ($K_P$) being disposed at the end with respect to the annular piston (16).

13. An actuator (12', 12") according to claim 2, the actuator being constructed in the form of a clutch slave cylinder with a central blind bore (94', 94"), in which the piston (16', 16") is received to be longitudinally displaceable, in the cylinder housing (14', 14"), the piston being in actuation-effective connection with a central piston rod as setting element (G).

14. An actuator (12) according to claim 13, wherein the two hydraulic chambers ($K_{H1}$, $K_{H2}$) are formed at the outer circumference of the piston (16') to be disposed axially one behind the other, the pneumatic chamber ($K_P$) being disposed at the end with respect to the piston (16').

15. An actuator (12") according to claim 13, wherein the piston (16") has a central recess (104") into which a central projection (106") provided at the cylinder housing (14") enters, and wherein one ($K_{H1}$) of the hydraulic chambers is formed between the projection (106") of the cylinder housing (14") and the recess (104") of the piston (16") and another one ($K_{H2}$) of the hydraulic chambers is disposed at the outer circumference of the piston (16"), the pneumatic chamber ($K_P$) being disposed at the end with respect to the piston (16").

16. An actuator (12, 12', 12") according claim 2, wherein at least the sealing arrangement (18, 20; 18'; 18", 20") separating the pneumatic chamber ($K_P$) from the respective hydraulic chamber ($K_{H1}$, $K_{H2}$) comprises two axially spaced-apart sealing elements (54, 55, 66, 67; 54', 55', 66', 67'; 54", 55", 66", 67") with an intermediate space (62, 74; 62', 74'; 62", 74") therebetween, the intermediate space being connected with the environment by way of an equalization channel (64, 76; 64', 76'; 64", 76").

17. An actuator (12, 12', 12") according to claim 1, wherein at least the sealing arrangement (18, 20, 18'; 18", 20") separating the pneumatic chamber ($K_P$) from the respective hydraulic chamber ($K_{H1}$, $K_{H2}$) comprises two axially spaced-apart sealing elements (54, 55, 66, 67; 54', 55', 66', 67'; 54", 55", 66", 67") with an intermediate space (62, 74; 62', 74'; 62", 74") therebetween, the intermediate space being connected with the environment by way of an equalization channel (64, 76; 64', 76'; 64", 76").

18. An actuator (12', 12") according to claim 1, the actuator being constructed in the form of a clutch slave cylinder with a central blind bore (94', 94"), in which the piston (16', 16") is received to be longitudinally displaceable, in the cylinder housing (14', 14"), the piston being in actuation-effective connection with a central piston rod as setting element (G).

19. An actuator (12') according to claim 18, wherein the two hydraulic chambers ($K_{H1}$, $K_{H2}$) are formed at the outer circumference of the piston (16') to be disposed axially one behind the other, the pneumatic chamber ($K_P$) being disposed at the end with respect to the piston (16).

20. An actuator (12) according to claim 1, the actuator being constructed in the form of a central release device, wherein the cylinder housing (14) has in the region of a center axis (Z) a passage (22) for a transmission shaft and the piston received in the cylinder housing (14) to be longitudinally displaceable is an annular piston (16) carrying a release bearing as setting element (G).

* * * * *